United States Patent Office 3,487,046
Patented Dec. 30, 1969

3,487,046
NOVEL PYRAZOLIDONE DERIVATIVES SUBSTITUTED ON THE 4 POSITION WITH A PHENOL-HCHO-POLYAMINE ION EXCHANGE RESIN
Georges Negrevergne, 5 Cours de l'Intendance,
Bordeaux, France
No Drawing. Continuation-in-part of application Ser. No. 362,393, Apr. 24, 1964. This application Dec. 18, 1967, Ser. No. 691,197
Int. Cl. C07d 49/04; C08g 9/24
U.S. Cl. 260—51.5      4 Claims

ABSTRACT OF THE DISCLOSURE

Diphenylpyrazolidone derivatives, substituted on the 4 position and having the formula:

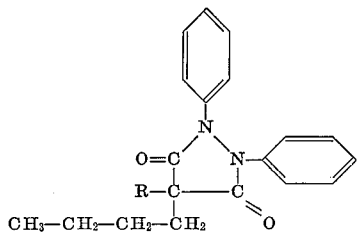

wherein R is selected from the group consisting of glycoses of from 3 through 6 carbons in chain length, polyoxyethylene having a molecular weight of from 200 through 2000 and an ionic exchange resin which is a polymeric condensation product of a phenol, formaldehyde and an alkylene polyamine which are known in the trade as Amberlite resins, and hydrogen bonded compounds of the structure:

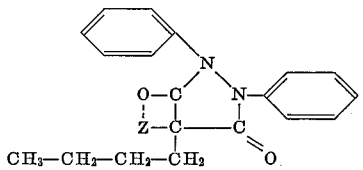

wherein Z is a compound of the group selected from algin, gum guar, pectin, psyllium, dextran and polyvinylpyrrolidone and the methods for the preparation of the aforesaid compounds. The compounds are useful in achieving an anti-inflammatory effect.

---

This application is a continuation-in-part of applicant's copending application Ser. No. 362,393, filed Apr. 24, 1964, now abandoned which was a continuation-in-part of applicant's then copending application Ser. No. 121,796, filed Apr. 24, 1961, now abandoned.

The present invention relates to new and novel compounds prepared from pyrazolidone, their process of manufacture and their pharmaceutical and therapeutic usage in both human and veterinary medicine. In particular, the present invention is concerned with mono and polyglycosidic compounds, polyoxyethylene compounds and hydrogen bonded compounds of 3,5-dioxo-1,2-diphenyl-4-n-butyl pyrazolidine. These compounds have a therapeutic and pharmacologic utility which is unique and possessing of advantages over the older therapeutic agents.

A problem in the treatment of arthritis and certain of the related pathologic states is one which is constantly present in the practice of both human and veterinary medicine. While many pharmacologic approaches to therapy have been suggested and many chemical entities synthesized and described as having a therapeutic effect, the clinician must still meet the problem of deciding upon the specific drug to treat a specific patient who presents symptons which fall into the accepted pathological criterion for these diseases.

In recent years, a pyrazolidone derivative, namely 3,5-dioxo-1,2-diphenyl-4-n-butyl pyrazolidine, has been utilized with clinical success in the treatment of various arthralgic states despite a number of inherent limitations. The common name for this compound is phenylbutazone. Phenylbutazone has been demonstrated to have a marked capacity to raise the pain threshold in laboratory animals, as well as exerting an antipyretic effect. Phenylbutazone exhibits anti-inflammatory properties in animals similar to cortisone, and although it has been shown that its action is not mediated through the pituitary-adrenal cortex axis, it causes sodium retention which may lead to edema. Tissue respiration studies have shown that the oxygen consumption of brain tissue is lowered as is the utilization of glucose by the tissues.

It has been demonstrated that phenylbutazone is slowly metabolized in man. The rate of biotransformation varies with different subjects although the range has been postulated to be from 10 percent to 40 percent a day.

It is well known that virtually small doses, as for example, 10 mg. percent in the blood stream, is required for the anti-flammatory beneficial therapeutic effect to be observed in patients with rheumatoid arthritis.

Phenylbutazone is extremely insoluble in water. In order to achieve solubility so that it may be administered and absorbed orally or by injection, the alkali metal salt has been formed. The sodium salt has received preference. The sodium salt of phenylbutazone thus formed, and its solution, are stable only in the more alkaline pH range because of the weak ionic strength of the pyrazolidine derivative and breakdown or decomposition occurs when the pH of the medium is less than 8.2.

This decomposition at a critical pH of 8.2 is highly significant since the physiological pH range is rarely above pH 7.6 and almost always between the range of pH 7.2 and pH 7.4. Moreover, when this drug (viz. the sodium salt), is administered orally, there is a virtually complete and instantaneous decomposition by the stomach contents which rarely, if ever, rise above pH 4 and most often is at pH 1 to 2. This decomposition of the alkali metal salts, moreover, results in an insoluble base substance which is then variably absorbed at a level limited to the solubility-product transfer, which conforms to the rates expressed by the law of mass action relating to substances difficulty soluble and decomposable in a dynamic system.

The consequences of this variable absorption and insolubility are best observed by the high dose range required for therapy. As much as 1 gm. has been commonly used. Larger amounts are employed for the treatment of certain patients having more serious disease.

The first effect observed, as a result of the precipitation of the base material of the sodium, salt in the stomach, is a delayed onset of effect until therapeutic blood levels are reached. This delay of onset of effect is readily apparent to the clinician and is described by him as the period of therapeutic latency. This latent therapeutic period is absent when the drug is administered perenterally, thus establishing that this phenomenon is due to the variable absorption which results in ineffective blood levels or until enough of the drug accumulates in the blood to exceed the threshold level of activity. Thus, with a biometabolic destruction rate of from 10 percent to 40 percent per day, the factor of the rate of development of the therapeutic blood level is governed only by the amount being absorbed in excess of this destruction.

Still another inherent limitation has arisen with the use of phenylbutazone which has caused the caution "the use must be enjoined with a careful follow-up of the patient's blood picture" as well as a restriction against long-term use in effective upper level doses, and this limitation is one of a blood dyscrasia (agranulocytosis). Liver damage has also been suggested.

The products of the present invention, by rendering 3,5-dioxo-1,2-diphenyl-4-n-butyl pyrazolidine either more soluble in physiologic media or by the control of the rate of absorption through alteration of the physical transport mechanisms involved by controlling the availability of the drug for absorption in accord with the demand of the dynamic system, avoids the above limitations of insolubility and/or variable absorption. Thus, the products of my invention may be given in lower dosage to achieve the same level of therapeutic effect, since they are either more soluble and/or more predictable in absorption, and the dosage administered to the individual patient may therefore be controlled so as to supply that quantity which is metabolized during a given period without permitting excesses to accumulate and cause its noxious toxic effect on the patient.

The individual determination of the rate of metabolism in the individual patient presents no problem since the metabolized compound is excreted via the kidney and reliable as well as sensitive methods of analysis are available and presently being practiced by the laboratory technician in both hospitals and private physicians' laboratories.

Therefore an effective, as well as reliable, means of avoiding the therapeutic limitations inherent in the compound phenylbutazone and its conventional basic salts may be conveniently and readily avoided by use of the present products.

Phenylbutazone glycoside is a solid white crystalline substance prepared through the general reaction of the alpha-halogen monoglycose and the metallic salt of 3,5-dioxo-1,2-diphenyl-4-n-butyl pyrazolidine. While any glycose may be used, we have found it is preferable to use a member of the class of sugars known as trioses, tetyoses, pentoses and hexoses. Although the higher glycoses may be used problems of isomerization restrict and limit certain aspects of the synthetic procedure. For this reaction, the appropriate sugar halide or alpha-halogen glycose may be either the fluoride, chloride, bromide or iodide derivative although it is preferred to use the bromide, chloride and iodide derivatives under practical synthetic conditions.

The reaction may be carried out in either aqueous, alcoholic or hydroalcoholic media, and may also be conducted in any other inert organic medium which does not interfere with the course of the reaction. It has been found that an alcoholic medium is preferred since the components are obtained in a state of purity requiring little or no purification as well as facilitating the separation of the product of the reacton. However, the products resulting after the use of other organic or aqueous solvents do not require such a degree of purification so as to render them therapeutically unusable.

It was found that the addition of small amounts of silver hydroxide, or copper powder, to this reaction will materially augment both the yield and the speed of reaction.

When silver hydroxide or copper powder are used as catalysts for this reaction the range of their concentration to be added is dependent upon the size of the reaction and will range from 0.01 to 0.10 percent of the reacting weight of the components used in the particular reaction.

The resulting phenylbutazone glycoside is soluble in water to a greater extent than phenylbutazone and is stable over the physiologic pH range. It may be administered therefore in a smaller dose to achieve a more ideal therapeutic effect without placing the patient in jeopardly of injury which may extend from gastric disturbance to fatal consequences.

Phenylbutazone glucoside is the addition product of glucose and phenylbutazone, which is obtained as a result of the interaction between phenylbutazone and an alpha-halo glucose, and for example, alpha-bromo glucose. In carrying out this reaction a neutral solvent such as isopropyl is used.

To an isopropyl alcohol solution of alpha-bromo glucose is added a stoichiometric equivalent of either an alkaline solution of phenylbutazone in isopropyl alcohol or a solution of the metallic salt of phenylbutazone in isopropyl alcohol. A catalyst of silver hydroxide or copper powder is utilized to complete the reaction. The glucoside of 3,5-dioxo-1,2-diphenyl-4-n-butyl pyrazolidine corresponds to the empiric formula $C_{25}H_{31}N_2O_7$ and analyzes in good agreement with its calculated theoretical values. This compound is to be distinguished from the acetylated glycosidic compounds of Morel (Experientiae 14:294, 1958) since Morel's compounds were not absorbed and had no activity. It is of interest to note that the d-acetylated glucoside could not be obtained from Morel's synthetic compound because of the extreme lability of the acetylated product. Thus, while the acetylated product has been prepared and found to be not absorbed in men, the present glucoside of 3,5-dioxo-1,2-diphenyl-4-n-butyl pyrazolidine is desirable by virtue of its activity.

Polymeric glycose derivatives may also be prepared through the use of the omega-halogen polyglycose compound in place of the alpha-halogen monoglycose and also polyoxyethylene derivatives may be formed through the use of the corresponding omega-halogen polyoxyethylene compound. When the omega-halogen polyoxyethylene derivatives are used, the corresponding polyoxyethylene derivative of 3,5-dioxo-1,2-diphenyl-4-n-butyl pyrazolidine results.

Hydrogen bonded chelation complexes may also be prepared. These generally fall into two fundamental groupings, such as those prepared with polymeric carbohydrate gums, as for example, pectin, gum guar, algin gum arabic and gum tragacanth.

New compounds of 3,5-dioxo-1,2-diphenyl-4-n-butyl pyrazolidine may be readily prepared with anionic exchange resins which are particularly adapted to this purpose and are condensation products of a phenol, formaldehyde and an alkylene polyamine, the alkylene group of which may be interrupted —N—H— to form alkylene chains of the last two carbon atoms between nitrogen atoms. These resins are known in commerce under the trade name of "Amberlite" and more particularly as "Amberlite-IR," or "Amberlite-IRP-58M or Amberlite XE-58M" and these are marketed by The Resinous Products and Chemical Company, Philadelphia, Pa. Resins of this same type are also marketed by other concerns under different trade names. Some of these resins and processes for their preparation are described in U.S. Patent No. 2,402,384, issued June 18, 1946, on an application of John W. Eastes, entitled "Ion-exchange Polyamine Resins and the Methods of Preparing Same." Although resins of the class described in the aforesaid patent may be employed, it is preferred to use the anionic exchange resin which is a condensation product of dihydroxy phenyl dimethyl methane, formaldehyde and tetraethylene pentamine, hereinafter called resin.

When the selected Amberlite exchange resin is reacted with 3,5-dioxo-1,2-diphenyl-4-n-butyl pyrazolidine, the resultant compound is formed by attachment of the resin in the 4 position of the pyrazolidine ring and the new compound has neither the properties of the free reagents nor that of a simple mixture, nor that of a salt. Thus, for example, the new compound formed of 3,5-dioxo-1,2-diphenyl-4-n-butyl pyrazolidine and Amberlite IRP-58M resin does not exhibit the acidic properties of the free pyrazolidine compound in its combining power with alkali nor may it be mechanically separated into its component parts through extraction with organic solvents, such as benzene or chloroform, as would a simple mixture. Neither does the formed compound ionize as would a salt and it does not have the electro-physical properties of a salt. The compound resulting from the reaction of the Amberlite IRP-58M resin with 3,5-dioxo-1,2-diphenyl-4-n-butyl pyrazolidine, is a stable, homogeneous product with reproducible and well defined physical-chemical properties, which are clearly distinguishable from the conventional salts. The new compound contains from 16 to 19 percent of the pyrazolidine moiety and has a sharp melting point of between 211–213° C. (with decomposition), which contrasts sharply to the melting point of 3,5-dioxo-1,2-diphenyl-4-n-butyl pyrazolidine, which is from 103° to 105° C. The new compound is insoluble in water.

The capacity of the resin to combine with 3,5-dioxo-1,2-diphenyl-4-n-butyl pyrazolidine is determined by the pH of the solution; by electrolyte concentration and by the pKa of the cation. Thus, a compound of the 3,5-dioxo-1,2-diphenyl-4-n-butyl pyrazolidine and the Amberlite XE-58M resin is formed to the extent of 0.6 meq./gm. of resin in distilled water but this ratio is doubled so that 1.2 meq./gm. of resin results when IM potassium chloride is substituted for the distilled water.

The infra-red spectra of the new compound 4-resin 3,5-dioxo-1,2-diphenyl-4-n-butyl pyrazolidine compound is characteristic for the new molecule. The characteristic phenylbutazone bands are not present in the infra-red spectra of the new compound and there is a shift in the bands characteristic for the resin. This change in the infra-red spectra of the component moieties of the new chelation compound establishes not only the identity of the new chelation compound but also a new physical-chemical reaction has taken place.

The particular resin used is known in the trade as "Amberlite XE-58" and is herein called resin. The Amberlite-XE-58 resin-3,5-dioxo-1,2-diphenyl-4-n-butyl pyrazolidine chelation compound was obtained by suspending 3 gm. of 3,5-dioxo-1,2-diphenyl-4-n-butyl pyrazolidine and 4 gm. of Amberlite XE-58 resin in 100 ml. of distilled water. The mixture was stirred for from 4 to 24 hours at room temperature and the insoluble material collected on a filter, washed with water and dried. The dried powder was then treated with benzene to remove excess 3,5-dioxo-1,2-diphenyl-4-n-butyl pyrazolidine and resulted in a resin complex containing 0.6 meq. 3,5-dioxo-1,2-diphenyl-4-n-butyl pyrazolidine per gm. of resin.

The compound represents a constant ratio of phenylbutazone to resin combined at the 4 position of the pyrazolidine ring. This ratio is constant and independent of reaction temperatures, concentration of reagents or stirring time. Thus, when water is employed as a solvent, the ratio of phenylbutazone to resin is 0.6 milliequivalent of 3,5-dioxo-1,2-diphenyl-4-n-butyl pyrazolidine per gm. of resin. However, when one molar potassium chloride solution or one molar sodium chloride solution is substituted for the distilled water, this ratio is doubled, so that a chelation compound representing 1,2-milliequivalents of 3,5-dioxo-1,2-diphenyl-4-n-butyl pyrazolidine per gm. of resin is obtained.

The following examples illustrate the scope of this invention.

Example 1

In a round-bottom, three-neck glass boiling flask fitted with a reflux condenser, and an automatic stirring device, place one liter of isopropyl alcohol to which is added exactly $1/10$ mol alpha-bromo-glucose. Stirring is started and when solution is achieved, exactly $1/10$ mol of the sodium salt of 3,5-dioxo-1,2-diphenyl-4-n-butyl pyrazolidine is added in small quantities with continued stirring. When all of the sodium salt of 3,5-dioxo-1,2-diphenyl-4-n-butyl pyrazolidine has been added, 0.3 gm. of freshly precipitated silver hydroxide is added at once and the mixture slowly heated to reflux temperature.

An almost instantaneous precipitation of sodium bromide occurs which continues until the reaction is complete. After a period of from one to two hours of refluxing, the mixture is cooled to room temperature and filtered. The solid material remaining on the filter is washed with a small quantity (10 cc.) of isopropyl alcohol and added to the filtrate. The alcohol solution thus obtained is concentrated under reduced pressure to $1/10$ its volume and the whole set aside to crystallize in an ice-chest. The crystals obtained are white, needlelike, melting with decomposition at 211–216° C. The compound is the glucoside of 3,5-dioxo-1,2-diphenyl-4-n-butyl pyrazolidine corresponding to the chemical composition of $C_{25}H_{31}N_2O_7$ and analyzes in good agreement with its calculated theoretical values.

Theory: 63.81% carbon; 6.43% hydrogen; 5.96% nitrogen. Found: 63.21% carbon; 6.21% hydrogen; 6.01% nitrogen.

The compound is moderately soluble in water, alcohol, methanol, ethanol, isopropanol, and insoluble in ether and benzene and is sufficiently pure after the first recrystallization to be used in therapy in the form of either a tablet, capsule or powder or a liquid preparation such as a syrup or elixir to be administered orally or a solution for parenteral use.

Example 2

In place of the alpha-bromo-glucose used in Example 1 above, there may be substituted the fluoro, chloro and iodo analogues in stoichiometric reacting equivalent amounts, of any of the members of the class of compounds known as trioses, tetroses, pentoses and hexoses. The remainder of the steps are as described in Example 1 above. The resulting compounds, however, will differ in physical and chemical properties dependent upon the length and nature of the glycose used (viz., triose, tetrose, pentose and hexose).

Similarly, should the various isomeric glycoses within a particular group be utilized (in their halogen derivative form), then the respective isomeric derivative of the phenylbutazone will result. The ratios of the reacting products in these instances remain the same and the steps to be taken are similar to or identical to those described in Example 1 above. The properties of the respective compounds are described as follows:

| | | | | Elemental Analysis | | | | |
| | | | | Percent Carbon | | Percent Hydrogen | | Percent Nitrogen | |
| Compound | Empiric Formula | M.P., °C. | Theory | Found | Theory | Found | Theory | Found |
|---|---|---|---|---|---|---|---|---|
| Number: | | | | | | | | |
| 1 Dihydroxypropyl phenylbutazone | $C_{22}H_{26}N_2O_4$ | 116–18 (dec.) | 69.09 | 70.10 | 6.85 | 6.62 | 7.33 | 6.99 |
| 2 Phenylbutazone erythroside | $C_{23}H_{28}N_2O_5$ | 187–88 (dec.) | 67.30 | 67.81 | 6.39 | 6.01 | 6.82 | 7.01 |
| 3 Phenylbutazone threoside | $C_{23}H_{28}N_2O_5$ | 192–94 (dec.) | 67.30 | 67.01 | 6.39 | 6.03 | 6.82 | 7.21 |
| 4 Phenylbutazone riboside | $C_{24}H_{28}N_2O_6$ | 193–95 (dec.) | 65.44 | 65.01 | 6.41 | 6.91 | 6.36 | 7.00 |
| 5 Phenylbutazone arabinoside | $C_{24}H_{28}N_2O_6$ | 201–04 (dec.) | 65.44 | 65.62 | 6.41 | 6.83 | 6.36 | 6.41 |
| 6 Phenylbutazone lyxoside | $C_{24}H_{28}N_2O_6$ | 207–10 (dec.) | 65.44 | 65.81 | 6.41 | 6.92 | 6.36 | 6.10 |
| 7 Phenylbutazone xyloside | $C_{24}H_{28}N_2O_6$ | 208–09 (dec.) | 65.44 | 65.83 | 6.41 | 6.10 | 6.36 | 6.15 |
| 8 Phenylbutazone manoside | $C_{25}H_{30}N_2O_7$ | 201–04 (dec.) | 63.81 | 64.01 | 6.43 | 6.73 | 5.96 | 5.81 |
| 9 Phenylbutazone sorboside | $C_{25}H_{30}N_2O_7$ | 187–88 (dec.) | 63.81 | 64.10 | 6.43 | 6.56 | 5.96 | 5.51 |
| 10 Phenylbutazone gluconate | $C_{25}H_{32}N_2O_8$ | 181 (dec.) | 59.51 | 58.91 | 6.40 | 6.61 | 5.55 | 5.83 |
| 11 Phenylbutazone glucuronate | $C_{25}H_{30}N_2O_9$ | 206 (dec.) | 59.75 | 59.31 | 6.02 | 5.91 | 5.57 | 5.12 |
| 12 Phenylbutazone mannuronate | $C_{25}H_{30}N_2O_9$ | 216 (dec.) | 59.75 | 59.82 | 6.02 | 6.10 | 5.57 | 5.15 |
| 13 Phenylbutazone galacturonate | $C_{25}H_{30}N_2O_9$ | 241 (dec.) | 59.75 | 59.61 | 6.02 | 6.21 | 5.57 | 5.41 |

The structural formula of the resultant phenylbutazone glycose compounds obtained as a result of the methods described in Example 1, above, through Example 5, below, may be represented as:

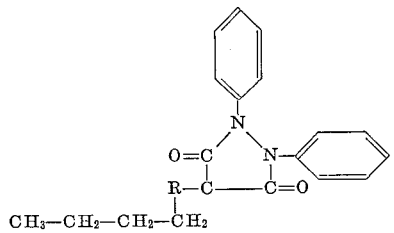

wherein R is selected from the group consisting of glycoses, having from 3 through 6 carbons and polymeric glycoses of which each glycose unit has from 3 through 6 carbons.

Example 3

In place of the alpha-bromo-glucose used in Example 1 and the halogen derivatives described in Example 2, there may be substituted in stoichiometric equivalent amount halogen polymeric glycose derivatives, each unit of the polymer moiety having from three to six carbons, the remaining steps of the reaction being the same, although the resulting compound will produce different solubility product relationships to that of the monoglycose derivatives. If the polymeric halogen glycose is alpha-bromo-polygalacturonate, then the resulting compound will have the empirical formula ($C_{25}H_{30}N_2O_9$), and a melting point of 160° C. (dec.). Microanalysis per micrometric unit reveals:

Theory: 59.75% carbon; 6.02% hydrogen; 5.59% nitrogen. Found: 59.43% carbon; 6.01% hydrogen; 5.72% nitrogen.

Example 4

In place of the isopropyl alcohol used as a solvent for the reaction described in Example 1, there may be substituted any liquid member of the class of alcohols corresponding to the general formula ROH, wherein R represents a straight or branched chain alkyl group of from 1 to 6 carbons.

These alcohols may be used in a ratio of from ½ to 1 liter for each 1/10 molar reaction size. Water may be utilized to replace all or a part of the alcohol as the solvent for the reaction and when the reaction medium is entirely aqueous or when water is present in amounts, in excess of 10 percent, the following procedure for isolation of the compound is necessary. The entire reaction mixture is evaporated to dryness (under reduced pressure) and the residue mixed with ethanol and boiled for five minutes, filtered and set aside to crystallize in an ice-chest. The compounds resulting may then be used in the preparation of pharmaceutical dose forms.

Example 5

In place of the silver hydroxide used in Example 1, there may be substituted an equal amount (weight for weight) of finely divided copper powder. Either catalyst may be used regardless of whether the solvent for the reaction consists of alcohol, water or hydro-alcoholic media. The ratio for the addition of the copper powder or the silver hydroxide as a catalyst for this reaction is from 0.01 to 0.1 percent of the reacting proportions.

Example 6

In a round-bottom three-neck glass boiling flask fitted with a reflux condenser and a stirring device is place exactly 1 mol of monochloropolyoxyethylene. Stirring is started and small quantities of sodium of 3,5-dioxo-1,2-diphenyl-4-n-butyl pyrazolidine is added until exactly one mol of the compound has been introduced into the reaction medium. The reaction is exothermic and cooling should be employed. The entire mixture may solidify. The solid mass is then dissolved with the aid of gentle heat, in sufficient ethanol to cause solution of the organic compound but to leave the insoluble sodium chloride in suspension. The mixture is filtered and the solvent alcohol removed by vacuum distillation and the resulting compound is sufficiently pure to be used for a pharmaceutical dose form.

It should be noted that the polyoxyethylene derivatives have a varying molecular weight depending upon the length of the polyoxyethylene chain used as the reactant and this will determine the ultimate physical properties of the respective compounds. Thus, if a monochloropolyoxyethylene compound with a molecular weight of from 200 to 600 is used the resulting compound will possess properties which are different from that resulting when the higher molecular weight polyoxyethylene halogen derivatives are used, as, for example, those with a molecular weight of from 600 to 2,000. The properties of typical compounds resulting from this reaction are described as follows:

| Compound | Physical State | Percent composition | | Solubility or dispersibility |
|---|---|---|---|---|
| | | Phenyl-butazone | Polyoxy-ethylene | |
| Phenylbutazone polyoxyethylene 200 | Oil | 87.23 | 12.77 | $H_2O$, ethanol, fixed oil. |
| Phenylbutazone polyoxyethylene 400 | Oil | 87.23 | 12.77 | $H_2O$ ethanol. |
| Phenylbutazone polyoxyethylene 2000 | Waxy solid | 87.23 | 12.77 | Do. |

The structural formula of the polyoxyethylene phenylbutazone compounds may be represented as:

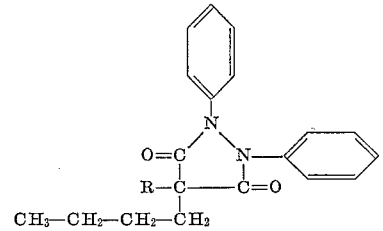

wherein R is a radical selected from the group consisting of polyoxyethylene groups having a molecular weight of from 200 through 2000.

Example 7

In place of the chloro derivative described in Example 6, there may be substituted the fluoro, bromo and iodo derivatives of the respective polyoxyethylene. The remainder of the steps are the same as described with the exception of the purification step wherein a higher alcohol should be utilized, as for example, hexanol, when the higher molecular weight compounds are used.

Example 8

The reaction as described in Example 6 may also be carried out in the presence of an alcohol solvent or an aqueous or hydro-alcoholic solvent as described in Example 4 above. Similarly, the ratios of silver hydroxide and copper powder may be utilized as described in Example 5 above.

Example 9

Chelation coordination compounds are prepared by reacting phenylbutazone with a hydrogen bonding compound. For example, one part of phenylbutazone is dissolved in 500 cc. of isopropyl alcohol, and to this is added 3 parts of gum guar. The mixture is stirred for one-half hour and then the solvent is slowly distilled at atmospheric pressure. The mixture is then wetted with 2 parts of water and granulated through a number 16 mesh sieve. The resultant compound is a creamy white powder which is dispersible in water and alcohol. It asseys in good agreement with the theoretical values for both the phenylbutazone moiety and the gum guar component. When dispersed in water there is a uniform distribution of the compound which does not sediment out and which does not permit the dialysis of the phenylbutazone radical. Infrared spectral analysis establishes the presence of a hydrogen bonded co-ordinate linkage thus confirming the presence of a molecular complex.

The preferred ratio between reacting components is from one part phenylbutazone to three parts of the gum guar, together a range of from 1:1 to 1:10 may be used. The new compound has the following structure:

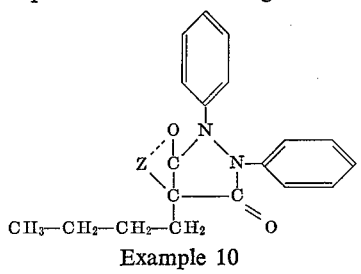

Example 10

In place of the gum guar described in Example 9 above, there may be substituted a reacting equivalent weight of pectin, or psyllium, or algin, or dextran, or polyvinylpyrrolidone. The remaining steps are the same as described in Example 9 about. The preferred ratios of phenylbutazone to pectin, psyllium, algin, dextran and polyvinylpyrrolidone is 1:3 although the ratio of 1:1 to 1:10 may be used. The resulting compounds are described as follows:

terial collected on a filter and washed with water. The solid material is dried and ground to a No. 40 standard mesh powder and extracted with two, 100 cc. portions of benzene. The dried powder weighs about 47 grams. The resultant powder is the new compound of 3,5-dioxo-1,2-diphenyl-4-n-butyl pyrazolidine-4-resin. It has a melting point of from 211° to 213° C. (with decomposition). The proportion of 3,5-dioxo-1,2-diphenyl-4-n-butyl pyrazolidine in the compound is 0.6 meq. of the compound per gm. of resin. This ratio is a constant ratio for the non-saline solvent used, and is independent of concentration of reagents or stirring time.

The new resin phenylbutazone compound has 13.26 percent nitrogen content and is insoluble in water, benzene and chloroform. The infra-red spectrum of the compound obtained as a Nujol mull is characteristic for the new compound. There is an absence of the bands for the pyrazolidine moiety and also there is a shift in the bands of the resin moiety.

The structural formula of the 4-resin-3,5-dioxo-1,2-diphenyl-4-n-butyl pyrazolidine, wherein the resin moiety consists of the condensation product of dehydroxy phenyl dimethyl methane, formaldehyde and tetraethylene pentamine, may be represented as:

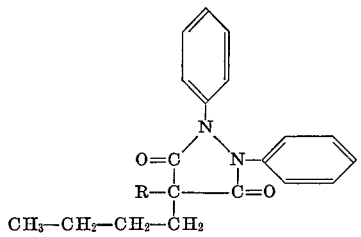

wherein R represents an ion exchange resin which may be any member of the class of resins known to the trade as "Amberlite" resins and which are the condensation product of dihydroxyphenyl-dimethyl methane, formaldehyde, and an alkylene polyamine.

| Compound | Physical state | Percent phenyl-butazone | Percent poly-saccharide | Solubility or dispersibility |
|---|---|---|---|---|
| Phenylbutazone algin | Solid | 61.19 | 38.81 | Insoluble in H₂O and fixed oil; dispersible in H₂O and ethanol. |
| Phenylbutazone pectin | do | 61.37 | 38.63 | Do. |
| Phenylbutazone polyvinylpyrrolidone | do | 73.51 | 26.49 | Do. |
| Phenylbutazone dextran | do | 65.54 | 34.46 | Do. |
| Phenylbutazone gum guar | do | 46.12 | 53.88 | Do. |
| Phenylbutazone psyllium | do | | | Do. |

The structural formula of the chelating coordination compounds may be represented as:

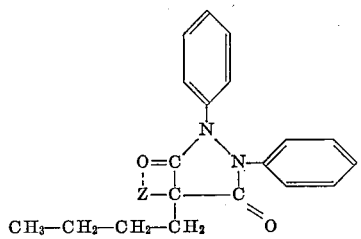

wherein Z is a chelating compound selected from the group of compounds such as algin, pectin, gum guar, psyllium, dextran and polyvinylpyrrolidone.

Example 11

In a suitable container fitted with a stirring device is placed 1 liter of distilled water and to this is added 30 gm. of 3,5-dioxo-1,2-diphenyl-4-n-butyl pyrazolidine. The stirring is started and then 40 gm. of Amberlite XE-58M anionic exchange resin, a condensation product of dihydroxy phenyl dimethyl methane, formaldehyde and tetraethylene pentamine, is added. The mixture is stirred for a period of at least 4 hours and then the insoluble ma- Example 12

In place of the distilled water used as a solvent in Example 11, there may be substituted in the same quantity, molar potassium chloride solution, molar sodium chloride solution and mixtures of these. The remainder of the steps being the same. The resultant compound isolated will have a proportion of 1.2 meq. of 3,5-dioxo-1,2-diphenyl-4-n-butyl pyrazolidine per gm. of the resin. This ratio is a constant ratio when the saline solvent is used and is independent of the proportions of the reagents utilized or the stirring time. The structure of the compound is the same as described in Example 11 above.

Example 13

In place of the Amberlite XE-58M resin used in Examples 11 and 12, there may be substituted in equivalent quantities, any of the anionic exchange resins which are known to the trade as the Amberlite resins and which are the condensation product of dihydroxy-phenyl dimethyl methane, formaldehyde and an alkylene polyamine. The remainder of the steps being the same and the resultant products obtained will correspond to that obtained after Example 11, having a chelation combining ratio of 0.6 meq. of 3,5-dioxo-1,2-diphenyl-4-n-butyl pyrazolidine per gm. of resin, when water is used as the solvent and 1.2 meq. of 3,5-dioxo-1,2-diphenyl-4-n-butyl pyrazolidine per gm. of resin when a molar potassium chloride or sodium chloride solution is used as the solvent, as described in Example 12. The structure of the compounds is the same as described in Examples 11 and 12 above.

Example 14

When it is desired to use the glycosides of phenylbutazone, the glycuronic acid salts of phenylbutazone, and the polyoxyethylene derivatives of phenylbutazone, the polymeric chelation complexes of phenylbutazone and the 4-resin, 3,5-dioxo-1,2-diphenyl-4-n-butyl pyrazolidine in therapy, these may be administered in the suitable pharmaceutical dosage forms as for example, in the form of a tablet, capsule, or suppository. A dosage range of from 50 mg. to 1 gram, depending upon the individual patient's needs, may be administered in order to obtain an analgeic, antipyretic and anti-inflammatory and uricosuric effect in the treatment of gout, rheumatoid, arthritis, and thrombo-phlebitis. Because of the unique properties of these compounds, it will be generally found that the preferred dosage range will be from 50 mg. to 200 mg. given one to three times daily.

In preparing tablets the desired active ingredient is mixed with an equal amount of diluent, as for example, powdered lactose, or powdered starch, and to this is added 0.01 part of magnesium stearate and the whole granulated with a gelatin-water mixture, utilizing a No. 16 mesh sieve. The granulation is then compressed into tablets having the desired size and shape, so that each unit dose will contain from 50 mg. to 200 mg. of the active substance.

Capsules may be prepared by filling the appropriate gelatin container with the granulation or with a mixture of equal parts of the active ingredient and the diluent. The unit dosage range to be employed when capsules are manufactured is from 50 mg. to 200 mg. of the active compound.

Suppositories are manufactured by mixing an appropriate suppository base, as, for example, cocoa butter, polyoxyethylene glycol, or mixtures of these with the active ingredient so that each suppository will contain about 50 mg. to 200 mg. of the active compound per unit dose. There is no need for diluents or binders since the compounds are both stable and dispersible.

Parenteral solutions are prepared by dissolving the water soluble members of this series, as for example, phenylbutazone glycoside, in water-for-injection so that each cc. will contain 100 mg. of the active substance. It may be found to be convenient to use a range of from 50 mg. to 500 mg. per cc., which may be prepared through adjusting the appropriate solvent-active ingredient-temperature relationships at the time of manufacture but for ordinary therapeutic use, solutions containing 100 mg. per cc. will be found most satisfactory. The solutions for parenteral use are packaged in glass ampules and hermetically sealed. The solutions are stable and may be sterilized by the conventional techniques as for example, autoclaving.

The compounds of the present invention are therapeutically co-extensive with phenylbutazone and its metal salts. Thus, they may be employed as analgesics, antipyretic compounds, anti-inflammatory agents, uricosuric agents and particularly in the treatment of such conditions as rheumatoid arthritis, acute bursitis, thrombophlebitis and gout.

It is not desired to be limited except as set forth in the following claims, the above description being by way of illustration of the invention.

I claim:
1. A compound having the formula:

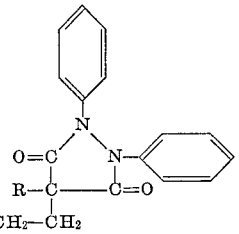

$CH_3$—$CH_2$—$CH_2$—$CH_2$ wherein R is a polyamine ion exchange resin moiety comprising the condensation product of phenol, formaldehyde and an alkylene polyamine.

2. A compound of claim 1, wherein R is a polyamine ion exchange resin comprising the condensation product of dihydroxy-phenyl-dimethyl-methane, formaldehyde and tetraethylene pentamine.

3. The method of preparing compounds having the structure:

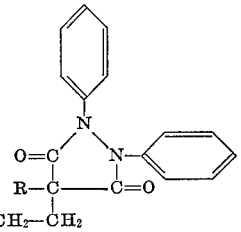

$CH_3$—$CH_2$—$CH_2$—$CH_2$ wherein R is selected from the group consisting of polyamine ion exchange resins which are polymeric condensation products of phenol, formaldehyde and an alkylene polyamine, which comprises the steps of dissolving in an inert medium a metallic salt of 3,5-dioxo-1,2-diphenyl-4-n-butyl, pyrazolidine, adding a molecular equivalent quantity of an ion exchange polyamine resin which comprises a polymeric condensation product of a phenol, formaldehyde and an alkylene polyamine, stirring, evaporating the solution and recovering 3,5-dioxo-1,2,diphenyl-4-n-butyl,4(R)-pyrazolidine wherein R is a polyamine ion exchange resin comprising the condensation product of phenol, formaldehyde and an alkylene polyamine.

4. The method of claim 3, wherein said polyamine ion exchange resin is the condensation product of dihydroxyphenyl-dimethyl-methane, formaldehyde and tetraethylene pentamine.

References Cited

FOREIGN PATENTS 1,622    1/1963    France.
1,623    1/1963    France.
1,624    1/1963    France.

HAROLD D. ANDERSON, Primary Examiner

H. SCHAIN, Assistant Examiner

U.S. Cl. X.R.

260—2, 2.1, 2.2, 29.3, 33.4, 59, 88.3, 205, 209.5, 209.6, 210, 310; 424—79, 180, 273